United States Patent [19]

Iwasaki et al.

[11] Patent Number: 4,812,158

[45] Date of Patent: Mar. 14, 1989

[54] CAKING-PREVENTING AGENT FOR FERTILIZER

[75] Inventors: Tetsuji Iwasaki; Hitoshi Hosokawa, both of Wakayama, Japan

[73] Assignee: Kao Corporation, Tokyo, Japan

[21] Appl. No.: 231,609

[22] Filed: Aug. 11, 1988

Related U.S. Application Data

[63] Continuation of Ser. No. 947,810, Dec. 30, 1986, abandoned.

[30] Foreign Application Priority Data

May 21, 1986 [JP] Japan .................................. 61-116719

[51] Int. Cl.$^4$ ........................... C05G 3/00; C05C 9/00; C05C 13/00
[52] U.S. Cl. ...................................... 71/64.12; 71/27; 71/30
[58] Field of Search ................. 71/1, 11, 27, 30, 64.12

[56] References Cited

U.S. PATENT DOCUMENTS 3,660,070  5/1972  Maruta et al. ...................... 71/30 X
3,953,192  4/1976  Hodgson et al. ................... 71/64.12

Primary Examiner—Ferris H. Lander
Attorney, Agent, or Firm—Birch, Stewart, Kolasch & Birch

[57] ABSTRACT

A fertilizer is effectively prevented from caking with an aqueous composition comprising an aqueous solution obtained by solubilizing a water-insoluble synthetic polymeric compound by a concentrated aqueous solution of a salt of an alkyl sulfate having 6 to 10 carbon atoms, an α-olefinsulfonate having 6 to 10 carbon atoms, an alkylsulfonate having 6 to 10 carbon atoms or an alkylbenzenesulfonate having an alkyl group having 4 to 8 carbon atoms, said aqueous solution containing a wet spread sticking agent in an amount of 1.0 to 50% by weight based on the synthetic polymeric compound.

10 Claims, No Drawings

CAKING-PREVENTING AGENT FOR FERTILIZER

This application is a continuation of application Ser. No. 947,810 filed on Dec. 30, 1986 and now abandoned.

The present invention relates to a caking-preventing agent for fertilizers having a caking tendency, such as urea, ammonium sulfate, ammonium nitrate, ammonium chloride or composite fertilizers.

STATEMENT OF PRIOR ARTS

As a caking-preventing agent for the above-mentioned caking fertilizers, there has been proposed a solution obtained by solubilizing a substantially water-insoluble polymeric compound by a concentrated solution of an anionic surface active agent (hereinafter referred to as "solubilized polymer solution") (see Japanese Patent Publication No. 17104/1974), and it is said that the solubilized polymer solution exhibits an excellent caking-preventing effect on urea and the like. This solubilized polymer solution is added to a caking fertilizer directly or after it has been diluted to an appropriate concentration. The water is substantially removed to obtain an excellent caking-preventing effect.

However, the above-mentioned caking-preventing agent is not completely satisfactory.

More specifically, since the viscosity of the above-mentioned caking-preventing agent is too high, the concentration cannot be increased, and if the caking-preventing agent is sprayed on a caking fertilizer, it is impossible to uniformly stick the caking-preventing agent to fertilizer particles. Moreover, under severe storage conditions where high temperatures and low temperatures appear repeatedly, the stability is not sufficient.

SUMMARY OF THE INVENTION

We made research with a view to overcoming the foregoing defects, and as the result, it was found that if a wet spread sticking agent is incorporated in the conventional solubilized polymer solution, the foregoing defects are overcome and the caking-preventing effect is improved. We have now completed the present invention based on this finding.

More specifically, in accordance with the present invention, there is provided a caking-preventing agent for a fertilizer, which comprises an aqueous solution obtained by solubilizing a substantially water-insoluble synthetic polymeric compound by a concentrated aqueous solution of a salt of an alkyl sulfate having 6 to 10 carbon atoms, an α-olefinsulfonate having 6 to 10 carbon atom, an alkylsulfonate having 6 to 10 carbon atoms or an alkylbenzenesulfonate having an alkyl group having 4 to 8 carbon atoms, said aqueous solution containing a wet spread sticking agent in an amount of 1.0 to 50% by weight based on the synthetic polymeric compound.

As the substantially water-insoluble synthetic polymeric compound (hereinafter referred to as "water-insoluble polymeric compound") used in the present invention, there can be mentioned polyvinyl acetate, a vinyl acetate/ethylene copolymer, alkyl (meth)acrylate homopolymers and copolymers, vinyl acetate-grafted polyvinyl alcohol copolymers, acetalized polyvinyl alcohol, butyralized polyvinyl alcohol, formalized polyvinyl alcohol, vinyl acetate/vinylpyrrolidone copolymers and vinyl acetate/maleic anhydride copolymers.

Among these water-insoluble polymeric compounds, polyvinyl acetate is especially preferred.

The degree of polymerization of the water-insoluble polymeric compound should be within such a range that the polymeric compound is soluble in a concentrated solution of the solubilizing agent, and generally the degree of polymerization is at least 10, preferably in the range of from 100 to 3000.

As the alkyl sulfate having 6 to 10 carbon atoms, that is used in the present invention, there can be mentioned hexyl sulfate, octyl sulfate and decyl sulfate. The solubilizing agent such as an alkyl sulfate as mentioned above is used in the form of a salt with an alkali metal such as sodium, potassium or lithium or an alkaline earth metal such as calcium, magnesium or strontium.

As the α-olefin sulfonate having 6 to 10 carbon atoms, that is used in the present invention, there can be mentioned a product obtained by treating an α-olefin having 6 to 10 carbon atoms with a sulfonating or sulfating agent such as $SO_3$ and neutralizing the treated α-olefin with an alkaline agent, and the product includes various isomers according to the reaction conditions. The α-olefinsulfonate prepared according to an ordinary process comprises about 20 to about 60% by weight of an alkenylsulfonate (hereinafter referred to as "alkenyl compound") and about 40 to about 80% by weight of a hydroxyalkylsulfonate (hereinafter referred to as "hydroxyl compound"). The alkenyl compound is composed mainly of unsaturated compounds having a double bond between the 2- and 3- or 3- and 4-positions, and small amounts of more internal unsaturated compounds are contained therein. The hydroxyl compound is composed mainly of a 3-hydroxyl compound, and small amounts of isomers having a hydroxyl group at other position are contained therein. The α-olefinsulfonate used in the present invention may contain various isomers as described above.

As the alkylsulfonate having 6 to 10 carbon atoms, that is used in the present invention, there can be mentioned hexylsulfonate, octylsulfonate and decylsulfonate. The alkylsulfonate is used in the form of a salt as described above with respect to the alkyl sulfate.

As the alkylbenzenesulfonate having an alkyl group having 4 to 8 carbon atoms, that is used in the present invention, there can be mentioned butylbenzenesulfonate, hexylbenzenesulfonate and octylbenzenesulfonate. The alkylbenzenesulfonate is used in the form of a salt as mentioned above with respect to the alkyl sulfate.

An appropriate solubilizing agent is selected from among the above-mentioned solubilizing agents according to the kind of the water-insoluble polymeric compound used, and the ratio of the solubilizing agent to the water-insoluble polymeric compound can be changed within a broad range. However, the ratio where attainment of an excellent effect is expected is naturally limited and this preferred ratio varies greatly according to the kind, molecular weight and synthesis process of the polymeric compound and the kind and purity of the solubilizing agent. In general, the ratio of the solubilizing agent to the water-insoluble polymeric compound is in the range of from 1/9 to 9/1. Even if the solubilizing agent is used in a larger amount, the water-insoluble polymeric compound can be solubilized, but if the amount of the solubilizing agent is larger than 90%, the caking-preventing effect is degraded and the caking-preventing effect is not substantially different from the caking-preventing effect of the solubilizing agent. On the other hand, if the amount of the water-insoluble polymeric compound is larger than 90%, the resulting mixture shows a high hydrophilic property and no satisfactory caking-preventing effect can be obtained.

The wet spread sticking agent used in the present invention improves the ability of the solubilized polymeric compound in wetting a fertilizer and assists uniform sticking of the former to the latter. As the wet spread sticking agent, there can be used a water-soluble polymer and a nonionic surface active agent. As the water-soluble polymer, there can be mentioned polyvinyl alcohol, a water-soluble saponification product of polyvinyl acetate, polyethylene glycol, hydroxypropylcellulose, sodium carboxymethylcellulose and hydroxypropylmethylcellulose, and as the nonionic surface active agent, there can be mentioned polyoxyalkylene type nonionic surface active agents such as polyoxyethylene alkyl ether, polyoxyethylene alkylphenyl ether, polyoxyethylene sorbitol fatty acid ester and polyoxyethylene alkyl ester. A nonionic surface active agent having an HLB value of 5.0 to 15.0 is especially preferred.

In the present invention, it is important that the wet spread sticking agent should be incorporated in an amount of 1.0 to 50% by weight based on the water-insoluble polymeric compound. If the amount of the wet spread sticking agent is smaller than 1.0% by weight, sticking to a fertilizer is insufficient, and if the amount of the wet spread sticking agent exceeds 50% by weight, the spraying operation becomes difficult because of an increase in the viscosity. It is preferred that the wet spread sticking agent be incorporated in an amount of 5 to 40% by weight based on the water-insoluble polymeric compound.

It is especially preferred that the water-soluble polymer and the nonionic surface active agent be used in combination as the wet spread sticking agent.

The process for the preparation of the caking-preventing agent of the present invention is not particularly critical. For example, there can be mentioned a process in which a predetermined amount of a granular or emulsified water-insoluble polymeric compound is added to a concentrated aqueous solution (ordinarily 10 to 30% by weight) of the solubilizing agent, the mixture is stirred at room temperature or under heating to solubilize the polymeric compound and the wet spread sticking agent is added to the formed solution, and a process in which the wet spread sticking agent is added to an aqueous solution of the solubilizing agent or the water-insoluble polymeric compound and solubilization is then effected. In the latter process, the wet spread sticking agent may be added when an emulsion of the water-insoluble polymeric compound is prepared.

In the present invention, the caking-preventing agent may be added to a fertilizer according to means customarily adopted in this field. For example, the caking-preventing agent may be added to a fertilizer slurry, or a solution of the caking-preventing agent may be sprayed on the surface of a powdery, crystalline or granular substance to be treated. In the latter case, in order to enhance the spraying efficiency, it is preferred that a solution of the caking-preventing agent be jet-sprayed while the substance to be treated is being transported on a belt conveyor or is falling in the form of a stream from a conveyor or the like.

The caking-preventing agent of the present invention is obtained in the form of a concentrated aqueous solution (with the solid content of 25 to 50% by weight). The solution may be applied to a fertilizer directly or after it has been diluted.

The caking-preventing agent of the present invention is applied to the substance to be treated in an amount of 0.005 to 0.5% by weight as the sum of the polymeric compound and solubilizing agent based on the substance to be treated.

(EFFECTS OF THE INVENTION)

By using the caking-preventing agent of the present invention comprising the wet spread sticking agent in an amount of 1.0 to 50% by weight based on the substantially water-insoluble synthetic polymeric compound, the sticking ability to a substance to be treated is increased and the caking-preventing effect is enhanced.

As the secondary effect, an effect of reduction in dust generation by mechanical shocks can be attained by using the caking-preventing agent of the present invention.

Furthermore, by addition of the wet spread sticking agent to the present invention, the viscosity of the product can be greatly reduced and the concentration can be increased, so that the obtained solution can be directly scattered and sprayed without dilution.

(EXAMPLES)

The present invention will now be described in detail with reference to the following examples that by no means limit the scope of the invention.

EXAMPLE 1

A 25% by weight aqueous solution of a caking-preventing agent shown in Table 1 in an amount corresponding to 0.05% by weight of granular urea (1 to 2 mm in diameter) was diluted two-fold and uniformly sprayed on 2 kg of granular urea. Then, 45 g of the urea was filled in a cylindrical mold made of rigid polyvinyl chloride having an inner diameter of 4 cm and pressed under a pressure of 2.0 kg/cm$^2$. The urea was allowed to stand still in this state at a temperature of 30° C. and a relative humidity of 78% for 28 days. Then, the urea was taken out of the cylinder and the fracture strength was measured by using a tensilon compression strength meter (supplied by Toyo Baldwin).

The obtained results are shown in Table 1.

TABLE 1

| | Recipe No. | Caking-Preventing Agent | | | | Fracture Strength (kg/cm$^2$) |
| --- | --- | --- | --- | --- | --- | --- |
| | | Polymeric Compound | Solubilizing Agent | Wet Spread Sticking Agent | Mixing Ratio | |
| Comparative | 1 | — | — | — | — | 7.4 |
| | 2 | PVAc | sodium octyl sulfate | — | 1/4 | 3.5 |
| Present Invention | 3 | PVAc | sodium octyl sulfate | polyvinyl alcohol (MW = 6000) | 1/4/0.1 | 0.4 |
| | 4 | PVAc | sodium octyl sulfate | POE(10) nonyl phenyl ether | 1/4/0.1 | 0.6 |
| | 5 | PVAc | sodium octyl sulfate | polyvinyl alcohol (MW = 6000) POE(10) nonyl phenyl ether | 1/4/0.05 /0.05 | 0.1 |
| | 6 | PVB | sodium decyl sulfate | water-soluble saponified polyvinyl acetate | 1/7/0.04 | 0.7 |
| | 7 | PVF | sodium α-olefin (C$_8$)- | POE(5) lauryl ether | 1/3/0.2 | 0.5 |

TABLE 1-continued

| Recipe No. | Caking-Preventing Agent | | | Mixing Ratio | Fracture Strength (kg/cm²) |
|---|---|---|---|---|---|
| | Polymeric Compound | Solubilizing Agent | Wet Spread Sticking Agent | | |
| 8 | EVA | sodium hexylbenzene-sulfonate | sodium carboxymethylcellulose | 1/6/0.05 | 0.7 |
| 9 | PVAcl | sodium hexyl sulfate | polyvinyl alcohol (MW = 1000) | 1/6/0.05 | 0.7 |
| 10 | PVAc | sodium octyl sulfate | polyvinyl alcohol (MW = 6000)* | 1/4/0.1 | 0.2 |
| 11 | PVAc | sodium octyl sulfate | POE(10) nonyl phenyl ether* | 1/4/0.1 | 0.2 |
| 12 | EVA | sodium hexylbenzene-sulfonate | sodium carboxymethylcellulose* | 1/6/0.05 | 0.5 |

Note
PVAc: polyvinyl acetate having a degree of polymerization of 500 (emulsion)
PVB: polyvinyl butyral having a degree of polymerization to 1100 and a degree of butyralization of 62%
PVAcl: polyvinyl acetoacetal having a degree of polymerization of 1100 and a degree of acetalization of 32%
PVF: polyvinyl formal having a degree of polymerization of 900 and a degree of formalization of 87%
EVA: 1/1 ethylene/vinyl acetate copolymer having a degree of polymerization of 2000
*wet spread sticking agent was added while the water-insoluble polymer emulsion was prepared (emulsion polymerization)

EXAMPLE 2

A 100-ml ceramic vessel was charged with 300 g of the treated urea obtained in Example 1, (each of receipes 1 through 12), and five spherical ceramic balls, each having a diameter of 2 cm and a weight of 30 g, were put into the ceramic vessel. The treated urea was pulverized for 20 minutes at a speed of 150 rpm. The weight of dusts having a size smaller than 32 mesh was measured and the dust ratio was calculated according to the following formula.

$$\text{Dust ratio (\%)} = \frac{\text{weight of dusts smaller than 32 mesh}}{\text{weight of fertilizer before pulverization}} \times 100$$

The obtained results are shown in Table 2.

TABLE 2

| | Recipe No. | Dust Ratio (%) |
|---|---|---|
| Comparative | 1 | 12.4 |
| | 2 | 11.8 |
| Present Invention | 3 | 10.0 |
| | 4 | 9.0 |
| | 5 | 10.1 |
| | 6 | 9.7 |
| | 7 | 9.8 |
| | 8 | 9.9 |
| | 9 | 10.0 |
| | 10 | 9.5 |
| | 11 | 9.4 |
| | 12 | 9.0 |

What is claimed is:

1. A caking-preventing fertilizer composition comprising an aqueous solution obtained by solubilizing a substantially water-insoluble synthetic polymeric compound dissolved in a concentrated aqueous solution of a solubilizing agent, said solubilizing agent being a salt of an alkyl sulfate having 6 to 10 carbon atoms, an α-olefin sulfonate having 6 to 10 carbon atoms or an alkylbenzene sulfonate having an alkyl group having 4 to 8 carbon atoms, wherein the ratio of said solubilizing agent to said water-insoluble synthetic compound is in the range of 1/9 to 9/1, and 1.0 to 50 percent by weight of a wet spread sticking agent based on the weight of said polymeric compound; and a fertilizer.

2. A composition as claimed in claim 1, in which said wet spread sticking agent is a water-soluble polymer or a nonionic surfactant.

3. A caking-preventing fertilizer composition according to claim 2, wherein said nonionic surface active agent has a HLB value of 5.0 to 15.0.

4. A composition as claimed in claim 1, in which said substantially water-insoluble synthetic polymeric compound has a polymerization degree of 10 to 3000.

5. A caking-preventing fertilizer composition according to claim 4 wherein said water-insoluble synthetic polymeric compound has a polymerization degree of 100 to 3000.

6. A composition as claimed in claim 1, which has a solid content of 25 to 50 percent by weight.

7. A caking-preventing fertilizer composition according to claim 1 wherein said water-insoluble polymeric compound is selected from the group consisting of polyvinyl acetate, a vinyl acetate/ethylene copolymer, alkyl acrylate homopolymers and copolymers, vinyl acetate-grafted polyvinyl alcohol copolymers, acetalized polyvinyl alcohol, butyralized polyvinyl alcohol, formalized polyvinyl alcohol, vinyl acetate/vinyl-pyrrolidone copolymers and vinyl acetate/maleic anhyride copolymers.

8. A caking-preventing fertilizer composition according to claim 1 wherein said wet spread sticking agent is a combination of a water-soluble polymer and a nonionic surface active agent.

9. A caking preventing fertilizer composition according to claim 8, wherein said nonionic surface active agent has a HLB value of 5.0 to 15.0.

10. A caking-preventing fertilizer composition comprising an aqueous solution obtained by solubilizing a substantially water-insoluble synthetic polymeric compound dissolved in a concentrated aqueous solution of a solubilizing agent, said solubilizing agent being a salt of an alkyl sulfate having 6 to 10 carbon atoms, an α-olefin sulfonate having 6 to 10 carbon atoms or an alkylbenzene sulfonate having an alkyl group having 4 to 8 carbon atoms, wherein the ratio of said solubilizing agent to said water-insoluble synthetic compound is in the range of 1/9 to 9/1, and 1.0 to 50 percent by weight based on the weight of said polymeric compound, of a wet spread sticking agent, said wet spread sticking agent being a water soluble polymer selected from the group consisting of polyvinyl alcohol, a water-soluble saponification product of polyvinyl acetate, polyethylene glycol, hydroxypropylcellulose, sodium carboxymethylcellulose and hydroxypropyl methylcellulose;

or a nonionic surface active agent selected from the group consisting of polyoxyethylene alkyl ether, polyoxyethylene alkylphenyl ether, polyoxyethylene sorbitol fatty acid ester and polyoxyethylene alkyl ester; and a fertilizer.

* * * * *